(12) United States Patent
Wang (10) Patent No.: US 11,577,489 B2
(45) Date of Patent: Feb. 14, 2023

(54) LABEL STICKER

(71) Applicants: MEGA PRECISION PRINTING CO., LTD, Taipei (TW); Chih-Hung Wang, Taipei (TW)

(72) Inventor: Chih-Hung Wang, Taipei (TW)

(73) Assignees: Chih-Hung Wang, Taipei (TW); MEGA PRECISION PRINTING CO., LTD, Taipei (TW)

( * ) Notice: Subject to any disclaimer, the term of this patent is extended or adjusted under 35 U.S.C. 154(b) by 75 days.

(21) Appl. No.: 17/083,324

(22) Filed: Oct. 29, 2020

(65) Prior Publication Data

US 2021/0154973 A1 May 27, 2021

(30) Foreign Application Priority Data

Nov. 25, 2019 (TW) .................................. 108142821

(51) Int. Cl.
*G09F 3/00* (2006.01)
*G09F 3/10* (2006.01)
(Continued)

(52) U.S. Cl.
CPC .................. *B32B 7/12* (2013.01); *B32B 7/06* (2013.01); *B32B 27/08* (2013.01); *B32B 27/304* (2013.01); *B32B 27/32* (2013.01); *B32B 27/36* (2013.01); *B32B 27/40* (2013.01); *G09F 3/005* (2013.01); *G09F 3/10* (2013.01); *B32B 2405/00* (2013.01); *B32B 2519/00* (2013.01); *C09J 7/20* (2018.01);
(Continued)

(58) Field of Classification Search
CPC .. B32B 7/12; B32B 7/06; B32B 27/08; B32B 27/304; B32B 27/32; B32B 27/36; B32B 27/40; B32B 2405/00; B32B 2519/00; G09F 3/005; G09F 3/10; G09F 3/02; G09F 2003/0257; G09F 2003/0264; G09F 2003/0267; G09F 2003/0227; G09F 2003/023; G09F 3/0294; G09F 3/0297; G09F 2003/0213; G09F 2003/0263; G09F 2003/0266; G09F 2003/0222; C09J 7/20; C09J 2203/334; C09J 2301/12; C09J 7/40; Y10T 428/1476; A61F 13/02
See application file for complete search history.

(56) References Cited

U.S. PATENT DOCUMENTS

| 5,372,589 A * | 12/1994 | Davis ................... A61M 25/02 604/174 |
| 2004/0004014 A1* | 1/2004 | Grossman ............. A61F 15/002 206/440 |

(Continued)

*Primary Examiner* — Patricia L. Nordmeyer (57) ABSTRACT

A label sticker includes a release layer strip, an attachment layer strip and a label layer strip. The attachment layer strip is made of an artificial dressing material and its lower surface is coated with or adhered to a first glue layer. The lower surface of the attachment layer strip is attached to the upper surface of the release layer strip through the first glue layer. The label layer strip is made of a waterproof material and its lower surface is coated with or adhered to a second glue layer. The lower surface of the label layer strip is attached to the upper surface of the attachment layer strip through the second glue layer. The label sticker, to be adhered to the human skin to serve identification purposes, can be manufactured by mass production but is unlikely to be wetted and smeared.

8 Claims, 9 Drawing Sheets

(51) Int. Cl.
*G09F 3/02* (2006.01)
*B32B 7/12* (2006.01)
*B32B 7/06* (2019.01)
*B32B 27/08* (2006.01)
*B32B 27/30* (2006.01)
*B32B 27/32* (2006.01)
*B32B 27/36* (2006.01)
*B32B 27/40* (2006.01)
*C09J 7/20* (2018.01)

(52) U.S. Cl.
CPC ...... *C09J 2203/334* (2013.01); *C09J 2301/12* (2020.08); *G09F 3/02* (2013.01); *G09F 2003/0257* (2013.01); *G09F 2003/0264* (2013.01); *G09F 2003/0267* (2013.01); *Y10T 428/1476* (2015.01)

(56) References Cited

U.S. PATENT DOCUMENTS

| | | | | |
|---|---|---|---|---|
| 2005/0193609 A1* | 9/2005 | Schwartz | ............... | G09F 21/02 40/638 |
| 2006/0151347 A1* | 7/2006 | Grossman | ............. | A61F 15/001 206/440 |
| 2008/0281245 A1* | 11/2008 | Effing | ..................... | A61F 13/02 602/43 |
| 2009/0091120 A1* | 4/2009 | Welsh | ..................... | G09F 3/10 156/277 |
| 2018/0110658 A1* | 4/2018 | Lin | ................... | A61K 36/8988 |

* cited by examiner

LABEL STICKER

CROSS-REFERENCE TO RELATED APPLICATION

This non-provisional application claims priority under 35 U.S.C. § 119(a) on Patent Application No(s). 108142821 filed in Taiwan, R.O.C. on Nov. 25, 2019, the entire contents of which are hereby incorporated by reference.

BACKGROUND OF THE INVENTION

1. Field of the Invention

The present disclosure relates to label stickers, and in particular to a label sticker to be adhered to the human skin.

2. Description of the Related Art

Patients in the hospital wear scannable barcoded wristbands to facilitate computer-based patient identification and thus optimize hospital healthcare management. However, the barcoded wristbands still have room for improvement.

For example, neonatal and infant patients' wrists are too small to fit the barcoded wristbands. The wristbands will break loose, unless they are adhered to the neonatal and infant patients' wrists with adhesive tape. However, when too small, the wristbands are rigid enough to hurt the neonatal and infant patients' soft, fragile skin; and symptoms include redness, swelling, and even scratches.

In an attempt to overcome the aforesaid drawbacks of the prior art, identification stickers replace the aforesaid barcoded wristbands. Each identification sticker has a base, i.e., artificial skin dressing. A sticker dedicated to a patient is adhered to the artificial skin dressing. The sticker contains a barcode, text, picture or mark about the patient's personal information. The artificial skin dressing is soft and comfortable enough to preclude the aforesaid symptoms, including redness, swelling, and scratches.

However, the identification stickers cannot be manufactured by mass production, because of their complicated manufacturing process. The complicated manufacturing process of the identification stickers involves cutting an artificial skin dressing to appropriate size, cutting a barcode sticker to size corresponding to that of the artificial skin dressing, and adhering the barcode sticker to the artificial skin dressing, so as to obtain an identification sticker. The aforesaid manufacturing process of the identification stickers takes much time cutting the artificial skin dressing and barcode sticker to appropriate size and adhering them together, and thus the identification stickers cannot be manufactured by mass production.

Furthermore, it is impossible provide multiple identification stickers corresponding to multiple patients in the hospital concurrently. As a result, the identification stickers are not widely applied to hospital healthcare management, nor can they replace conventional barcode wristbands. In addition, the barcode stickers of the identification stickers are made of paper and thus are likely to be wetted and smeared. To prevent the barcode stickers from getting wetted and damaged, it is necessary to adhere waterproof film on the outer surface of the barcode stickers, thereby adding to the time taken to manufacture the identification stickers and rendering their mass production impossible.

BRIEF SUMMARY OF THE INVENTION

An objective of the present disclosure is to provide a label sticker, comprising: a release layer strip; an attachment layer strip made of an artificial dressing material, wherein a lower surface of the attachment layer strip is coated with or adhered to a first glue layer, and the lower surface of the attachment layer strip is attached to an upper surface of the release layer strip through the first glue layer; and a label layer strip made of a waterproof material, wherein a lower surface of the label layer strip is coated with or adhered to a second glue layer, and the lower surface of the label layer strip is attached to an upper surface of the attachment layer strip through the second glue layer.

Regarding the label sticker, two ends of the label layer strip and two ends of the attachment layer strip retract relative to two ends of the release layer strip.

To achieve at least the above objective, the present disclosure provides a label sticker, comprising: a release layer strip; an attachment layer strip made of an artificial dressing material, wherein a lower surface of the attachment layer strip is coated with or adhered to a first glue layer, and the lower surface of the attachment layer strip is attached to an upper surface of the release layer strip through the first glue layer; and a plurality of label pieces, wherein a lower surface of each said label piece is coated with or adhered to a second glue layer, and the lower surface of each said label piece is attached to an upper surface of the attachment layer strip through the second glue layer, the label pieces being spaced apart.

Regarding the label sticker, two ends of the attachment layer strip retract relative to two ends of the release layer strip.

Regarding the label sticker, a corner of each said label piece is a rounded angle, bevel angle or obtuse angle.

The label sticker further comprises a transit strip, the transit strip having a lower surface coated with or adhered to a third glue layer, the transit strip having a plurality of hollowed-out regions corresponding in number and position to the label pieces, each said hollowed-out region being of an area greater than a corresponding one of the label pieces, wherein the lower surface of the transit strip is attached to the upper surface of the attachment layer strip through the third glue layer, such that the label pieces and a portion of the attachment layer strip are exposed within the hollowed-out regions of the transit strip.

Regarding the label sticker, the transit strip is separable from the attachment layer strip.

To achieve at least the above objective, the present disclosure further provides a label sticker, comprising: a release layer strip; a plurality of attachment pieces made of an artificial dressing material, wherein a lower surface of each said attachment piece is coated with or adhered to a first glue layer, and the lower surface of each said attachment piece is attached to an upper surface of the release layer strip through the first glue layer, the attachment pieces being spaced apart;

and a plurality of label pieces corresponding in number to the attachment pieces, wherein a lower surface of each said label piece is coated with or adhered to a second glue layer, and the lower surface of each said label piece is attached to an upper surface of the attachment layer strip through the second glue layer.

Regarding the label sticker, corners of the attachment pieces and the label pieces are rounded angles, bevel angles or obtuse angles.

The label sticker further comprises a plurality of transit pieces corresponding in number to the label pieces, wherein each said transit piece has a lower surface coated with or adhered to a third glue layer and has a hollowed-out region of an area greater than a corresponding one of the label pieces, wherein the lower surfaces of the transit pieces are attached to the upper surfaces of the attachment pieces, respectively, through the third glue layer, such that corresponding ones of the label pieces and corresponding ones of the attachment pieces are exposed within the hollowed-out regions of the transit pieces, respectively.

The transit pieces are separable from the label pieces, respectively.

Owing to the label stickers, the identification stickers, which are to be adhered to the human skin, can be manufactured by mass production but are unlikely to be wetted and smeared.

DETAILED DESCRIPTION OF THE INVENTION

To facilitate understanding of the object, characteristics and effects of this present disclosure, embodiments together with the attached drawings for the detailed description of the present disclosure are provided.

Figure 1:
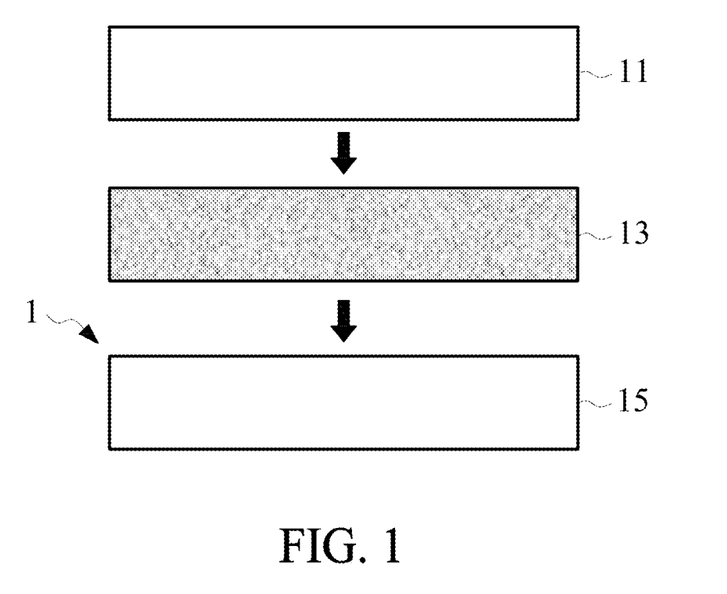
FIG. 1 is a top view of a process flow of manufacturing a label sticker according to the first embodiment of the present disclosure.
Figure 2:
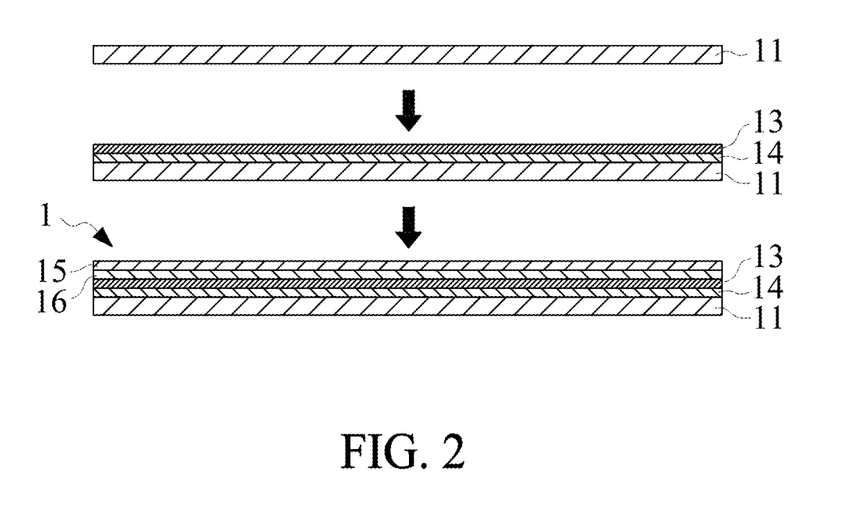
FIG. 2 is a cross-sectional view of a process flow of manufacturing the label sticker according to the first embodiment of the present disclosure.

The first embodiment of the present disclosure provides a label sticker 1. Referring to FIGS. 1, 2, the manufacturing process of the label sticker 1 includes a process flow described below.

The process flow involves providing a release layer strip 11 and then providing an attachment layer strip 13. The attachment layer strip 13 is made of an artificial dressing material. The lower surface of the attachment layer strip 13 is coated with a first glue layer 14; alternatively, a first glue layer 14 is provided and adhered to the lower surface of the attachment layer strip 13. The lower surface of the attachment layer strip 13 is attached to the upper surface of the release layer strip 11 through the first glue layer 14. Then, the process flow involves providing a label layer strip 15. The label layer strip 15 is made of a waterproof material. The lower surface of the label layer strip 15 is coated with a second glue layer 16; alternatively, a second glue layer 16 is provided and adhered to the lower surface of the label layer strip 15. The lower surface of the label layer strip 15 is attached to the upper surface of the attachment layer strip 13 through the second glue layer 16, the second glue layer 16 is directly attached to the upper surface of the attachment layer strip 13. Therefore, the label sticker 1 of the first embodiment is manufactured.

The label sticker 1 looks like a strip; consequently, to manufacture identification stickers which can be adhered to the human skin by mass production, the label sticker 1 is fed into a label printer (not shown), such that identification informations (for example, barcodes, words, pictures or marks) spaced apart by a specific distance are printed on the label layer strip 15 with the label printer. To prevent the identification informations on the label layer strip 15 from diffusing or blurring because of moisture or alcohol, the identification informations are printed with waterproof ink; however, in a variant embodiment, the identification informations are printed with conventional ink. Thus, a segment of the label sticker 1 is torn off the label sticker 1 along the spacing between two adjacent identification informations; alternatively, a label printer is capable of printing and cutting and is used to carry out the cutting process while printing the identification informations on the label layer strip 15. The segment torn off the label sticker 1 is an identification sticker ready for use.

With the aforesaid manufacturing process, manufacturing identification stickers through the label sticker 1 does not require cutting an artificial dressing material and a barcode sticker to appropriate, corresponding size and then adhering the barcode sticker to the artificial dressing material but only entails printing identification informations on the label sticker 1, and tearing a segment of the label sticker 1 off the label sticker 1 along the spacing between two adjacent identification informations, so as to obtain identification stickers concurrently. Therefore, the label sticker 1, to be adhered to the human skin, is conducive to manufacturing the identification stickers by mass production. The label layer strip 15 of the label sticker 1 is made of a waterproof material, such that the label sticker 1 cannot come into contact with water to otherwise get wetted and damaged. Therefore, the label sticker 1 prevents the identification stickers from getting wetted and damaged. During the conventional manufacturing process of the conventional identification stickers, cutting the artificial skin dressing and barcode sticker to appropriate size entails using more material of the artificial skin dressing than required, causing a waste of material and thus adding to the manufacturing cost of the conventional identification stickers. By contrast, manufacturing identification stickers with the label sticker 1 does not cause a waste of material and thus reduces manufacturing cost.

In this embodiment, an artificial dressing material of the attachment layer strip 13 is polyurethane (PU). However, in a variant embodiment, the material which the attachment layer strip 13 is made of any conventional material which an artificial dressing material is made of, for example, polyethylene (PE), as needed and thus is not limited to the first embodiment.

In the first embodiment, the waterproof material of the label layer strip 15 is polyethylene terephthalate (PET). However, in a variant embodiment, the material which the label layer strip 15 is made of is any conventional waterproof material, such as polyvinyl chloride (PVC) and polyethylene terephthalate (PET), as needed and thus is not limited to the first embodiment.

In this embodiment, the first glue layer 14 and the second glue layer 16 are made of acrylate. However, in a variant embodiment, the first glue layer 14 and the second glue layer 16 are made of silica gel, rubber or any other conventional plastic and thus is not limited to the first embodiment.

Figure 3:
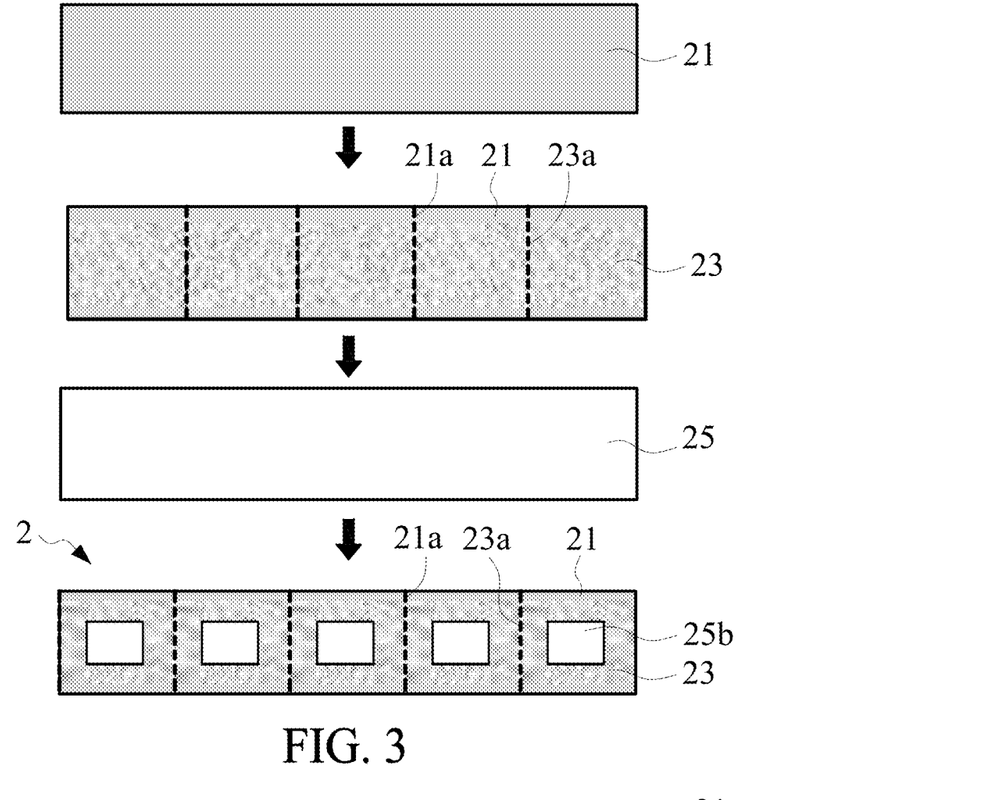
FIG. 3 is a top view of a process flow of manufacturing a label sticker according to the second embodiment of the present disclosure.
Figure 4:
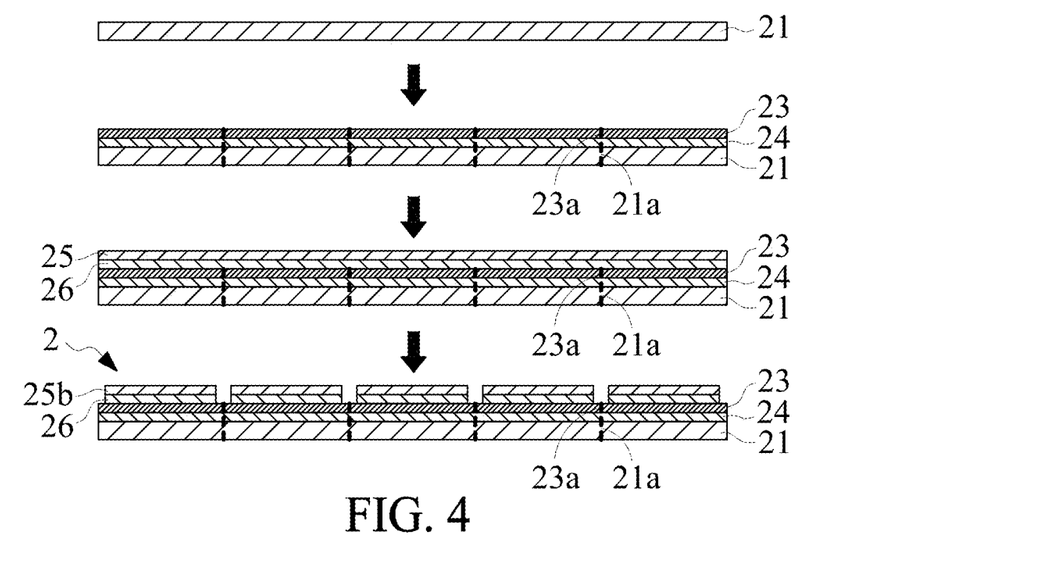
FIG. 4 is a cross-sectional view of a process flow of manufacturing the label sticker according to the second embodiment of the present disclosure.

The second embodiment of the present disclosure provides a label sticker 2. Referring to FIGS. 3 and 4, the manufacturing process of the label sticker 2 includes a process flow described below.

The process flow involves providing a release layer strip 21 and then providing an attachment layer strip 23. The attachment layer strip 23 is made of an artificial dressing material. The lower surface of the attachment layer strip 23 is coated with a first glue layer 24. The lower surface of the attachment layer strip 23 is attached to the upper surface of the release layer strip 21 through the first glue layer 24. With a cutter die (not shown), the release layer strip 21 and the attachment layer strip 23 are cut to form thereon a plurality of virtual cutter lines 21a, a plurality of virtual cutter lines 23a (the virtual cutter lines 23a correspond in position to the virtual cutter lines 21a), and two lateral edges of the attachment layer strip 23 are cut to form thereon two virtual cutter lines. After that, peripheral regions defined by two virtual cutter lines on the attachment layer strip 23 are pulled and removed, such that the width of the attachment layer strip 23 is less than the width of the release layer strip 21. Then, a label layer strip 25 is provided. The label layer strip 25 is made of a waterproof material. The lower surface of the label layer strip 25 is coated with a second glue layer 26. The label layer strip 25 is cut with a cutter die (not shown) to form a plurality of label pieces 25b. Then, continuous waste material (not shown) is lifted off the resultant label layer strip 25. The lower surfaces of the label pieces 25b are attached to the upper surface of the attachment layer strip 23. The label pieces 25b are spaced apart and disposed between the virtual cutter lines 23a, thereby finalizing the manufacturing process of the label sticker 2 of the second embodiment. The way of printing the identification information on the label sticker 2 with a label printer in the second embodiment is substantially the same as the way of printing the identification informations on the label sticker 1 with a label printer in the first embodiment. In the second embodiment, the identification informations are printed on the label pieces 25b, respectively.

In the second embodiment, the two ends of the attachment layer strip 23 retract relative to the two ends of the release layer strip 21, solving the problem described below. After the label sticker 2 has been manufactured by a factory, the label sticker 2 has to be cut to appropriate length, moved, transported, or fed into a label printer to print a barcode. However, doing so may cause the peripheral region of the attachment layer strip 23 to come into contact with an external object and thus be lifted off the release layer strip 21. As a result, not only is the structural integrity of the label sticker 2 destroyed, but the lower surface of the attachment layer strip 23 adhered to the human skin is also smeared. Since the two ends of the attachment layer strip 23 retract relative to the two ends of the release layer strip 21, external objects come into contact with the peripheral regions of the release layer strip 21 of the label sticker 2 rather than the peripheral regions of the attachment layer strip 23 with two retracted ends while the label sticker 2 is being processed, moved, transported or used, thereby preventing the attachment layer strip 23 from being lifted off the release layer strip 21.

The aforesaid structural feature that the two ends of the attachment layer strip 23 retract relative to the two ends of the release layer strip 21 is applicable to the label sticker 1 of the first embodiment; thus, the two ends of the attachment layer strip 13 and the two ends of the label layer strip 15 of the label sticker 1 retract relative to the two ends of the release layer strip 11 of the label sticker 1.

In the second embodiment, not only do the release layer strip 21 and the attachment layer strip 23 have virtual cutter lines 21a and virtual cutter lines 23a, but the virtual cutter lines 21a and the virtual cutter lines 23a are also located between the label pieces 25b. Thus, after the identification informations have been printed onto the label sticker 2, the user can obtain the identification stickers by tearing off the label sticker 2 along the virtual cutter lines by hand instead of using a knife. The virtual cutter lines of the second embodiment are applicable to the label sticker 1 of the first embodiment; thus, the release layer strip 11, the attachment layer strip 13 and the label layer strip 15 each have a plurality of virtual cutter lines corresponding in position to each other.

The release layer strip 21, the attachment layer strip 23, the first glue layer 24, the label layer strip 25 and the second glue layer 26 in the second embodiment are made of materials disclosed in the first embodiment.

FIGS. 3, 4 illustrated by the second embodiment show five label pieces 25b, but the present disclosure is not limited thereto. In a variant embodiment, a minimum of two label pieces are provided.

Figure 5:
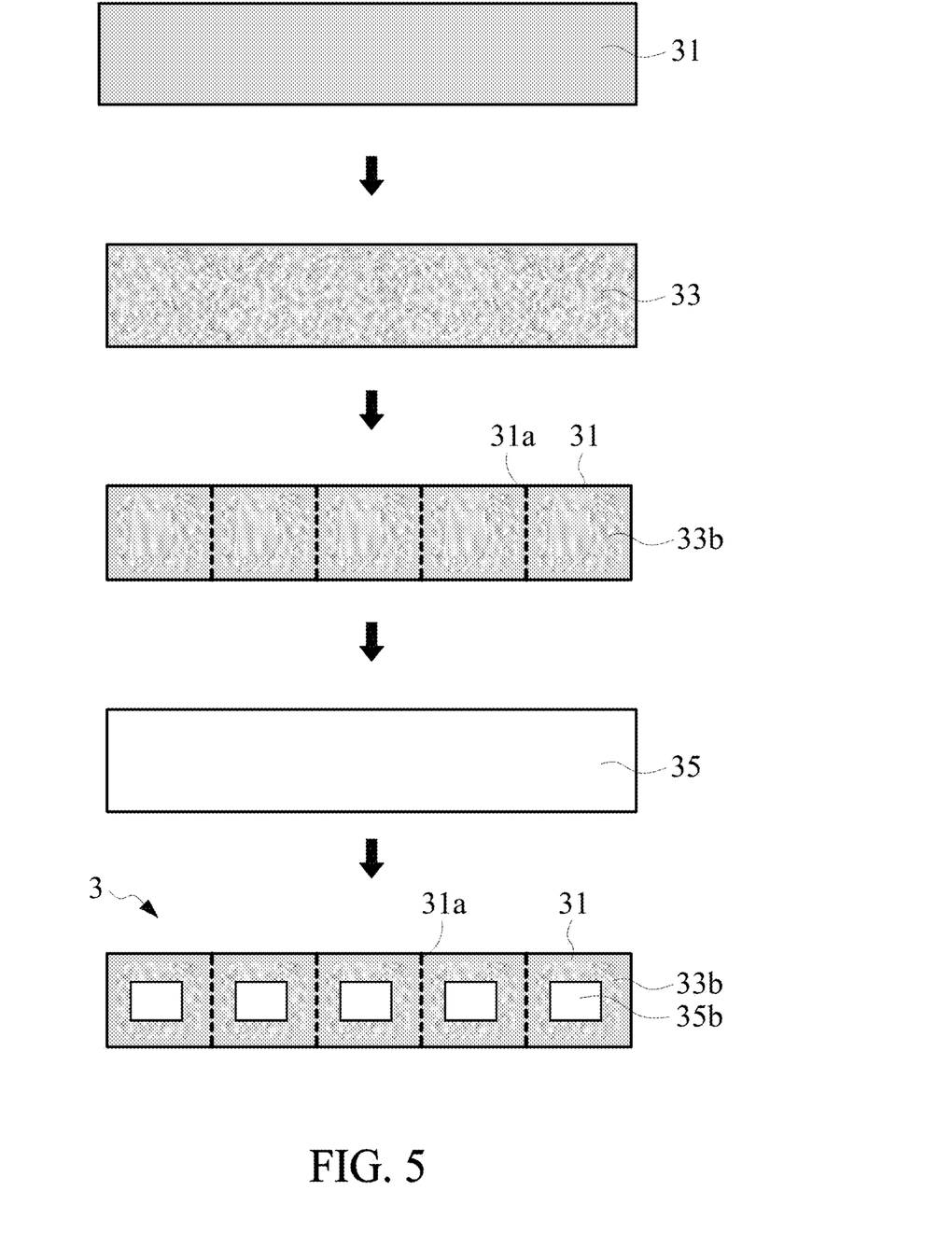
FIG. 5 is a top view of a process flow of manufacturing a label sticker according to the third embodiment of the present disclosure.
Figure 6:
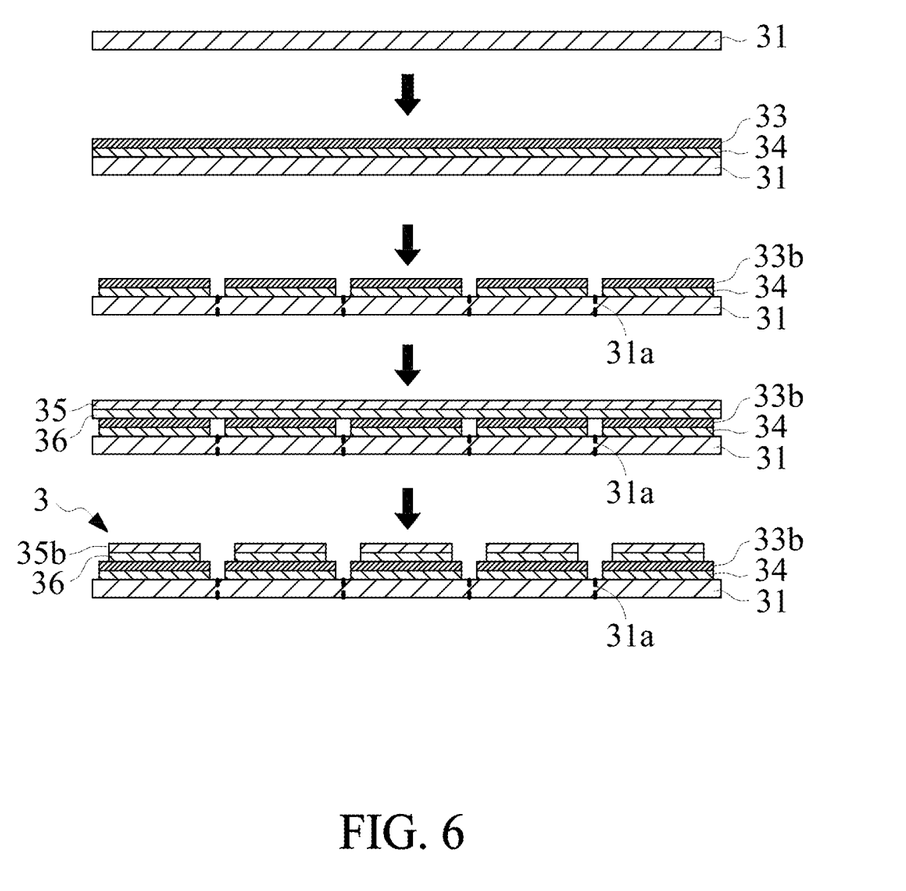
FIG. 6 is a cross-sectional view of a process flow of manufacturing the label sticker according to the third embodiment of the present disclosure.

The third embodiment of the present disclosure provides a label sticker 3. Referring to FIGS. 5 and 6, the manufacturing process of the label sticker 3 includes a process flow described below.

The process flow involves providing a release layer strip 31 and then providing an attachment layer strip 33. The attachment layer strip 33 is made of an artificial dressing material. The lower surface of the attachment layer strip 33 is coated with a first glue layer 34. The lower surface of the attachment layer strip 33 is attached to the upper surface of the release layer strip 31 through the first glue layer 34 and stamped with a cutter die (not shown) till the release layer strip 31, so as to form a plurality of virtual cutter lines 31a on the release layer strip 31 and a plurality of virtual cutter lines on the attachment layer strip 33, such that the virtual cutter lines define a plurality of attachment pieces 33b. Then, continuous waste material (not shown) is lifted off the attachment layer strip 33 which is stamped to form the virtual cutter lines and leave behind the attachment pieces 33b. The lower surfaces of the attachment pieces 33b are attached to the upper surface of the release layer strip 31. The attachment pieces 33b are spaced apart and disposed between the virtual cutter lines 31a. A label layer strip 35 is provided. The label layer strip 35 is made of a waterproof material. The lower surface of the label layer strip 35 is coated with a second glue layer 36. Then, the label layer strip 35 is cut with a cutter die (not shown) to form a plurality of label pieces 35b. The label pieces 35b correspond in number and cutting position to the attachment pieces 33b. Then, continuous waste material (not shown) is lifted off the label layer strip 35 to leave behind the label pieces 35b. The lower surfaces of the label pieces 35b are attached to the upper surfaces of the attachment pieces 33b. Thus, at this point in time, the manufacturing of the label sticker 3 of the third embodiment is finished. The way of printing the identification information on the label sticker 3 with a label printer in the third embodiment is substantially the same as the way of printing the identification informations on the label sticker 2 with a label printer in the second embodiment. In the third embodiment, the identification informations are printed on the label pieces 35b, respectively.

In the third embodiment, the attachment pieces 33b are discrete and thus can be separately lifted off. Therefore, to obtain the identification stickers, the user does not even need to tear off the label sticker 3 along the virtual cutter lines. The user only needs to tear attachment pieces 33b off the release layer strip 31 in order to obtain the identification stickers. Therefore, the acquisition of identification stickers through the label sticker 3 further dispenses with the step of cutting or tearing the label sticker 3.

In the third embodiment, the release layer strip 31, the attachment layer strip 33, the first glue layer 34, the label layer strip 35 and the second glue layer 36 are made of materials disclosed in the first embodiment.

FIGS. 5, 6 illustrated by the third embodiment show five label pieces 35b, but the present disclosure is not limited thereto. In a variant embodiment, a minimum of two label pieces are provided.

Figure 7:
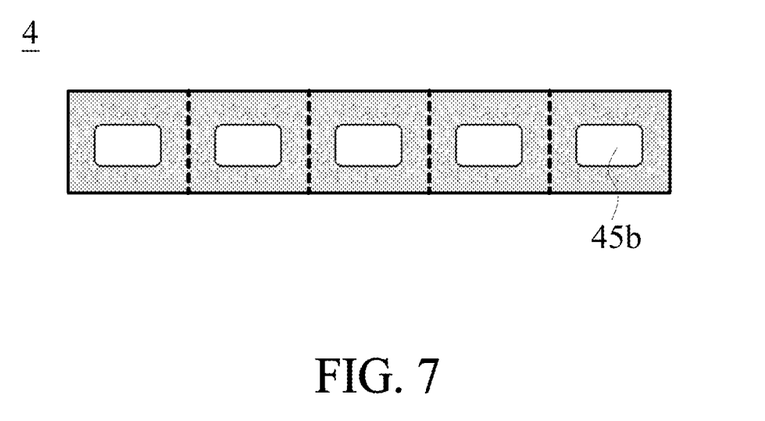
FIG. 7 is a top view of a label sticker according to the fourth embodiment of the present disclosure.

The fourth embodiment of the present disclosure provides a label sticker 4. Referring to FIG. 7, the label sticker 4 is substantially identical to the label sticker 2 of the second embodiment in structure, except that the corners of the label pieces 45b of the label sticker 4 are rounded angles. If corners of the label pieces are acute angles, the corners of the label pieces will be lifted off easily to thereby separate the label pieces from any external object which the corners of the label pieces have been in contact with or in friction with, because of stress concentration at the corners of the label pieces. In the fourth embodiment, the corners of the label pieces 45b are rounded angles to reduce stress concentration at the corners of the label pieces 45b when the corners of the label pieces 45b are in contact with or in friction with an external object, so as to lower the chance that the label pieces 45b will be lifted off the attachment layer strip 23. In the fourth embodiment, the corners of the label pieces 45b are rounded angles. However, in a variant embodiment, the corners of the label pieces 45b are obtuse angles or bevel angles or of any other shapes conducive to reduction in stress concentration and thus are not limited to the fourth embodiment.

Figure 8:
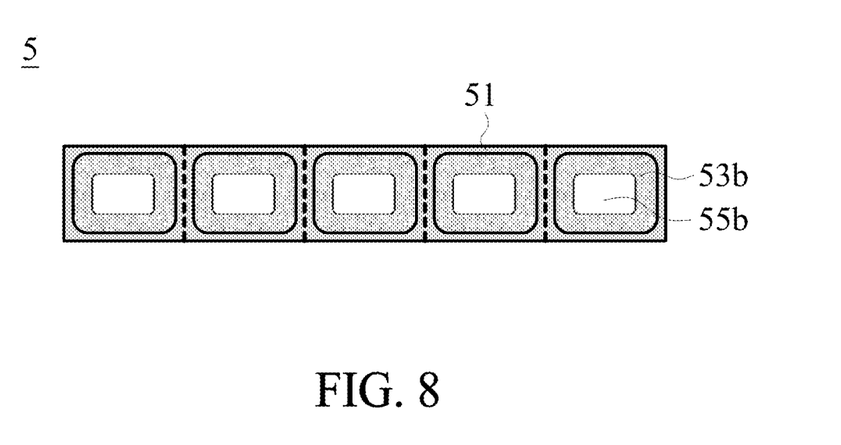
FIG. 8 is a top view of a label sticker according to the fifth embodiment of the present disclosure.

The fifth embodiment of the present disclosure provides a label sticker 5. Referring to FIG. 8, the label sticker 5 is substantially identical to the label sticker 3 of the third embodiment in structure, except that the corners of the attachment pieces 53b and label pieces 55b of the label sticker 5 are rounded angles. Like the shape of the label pieces 45b in the fourth embodiment, the shape of the label pieces 55b in the fifth embodiment lowers the chance that the label pieces 55b will be lifted off the attachment pieces 53b, and the shape of the attachment pieces 53b lowers the chance that the release layer strip 51 or the skin adhered thereto will be lifted off. In the fifth embodiment, the corners of the attachment pieces 53b and the label pieces 55b are rounded angle. However, in a variant embodiment, the corners of the attachment pieces 53b and the label pieces 55b are obtuse angles or bevel angles or of any other shapes conducive to reduction in stress concentration and thus are not limited to the fifth embodiment.

Figure 9:
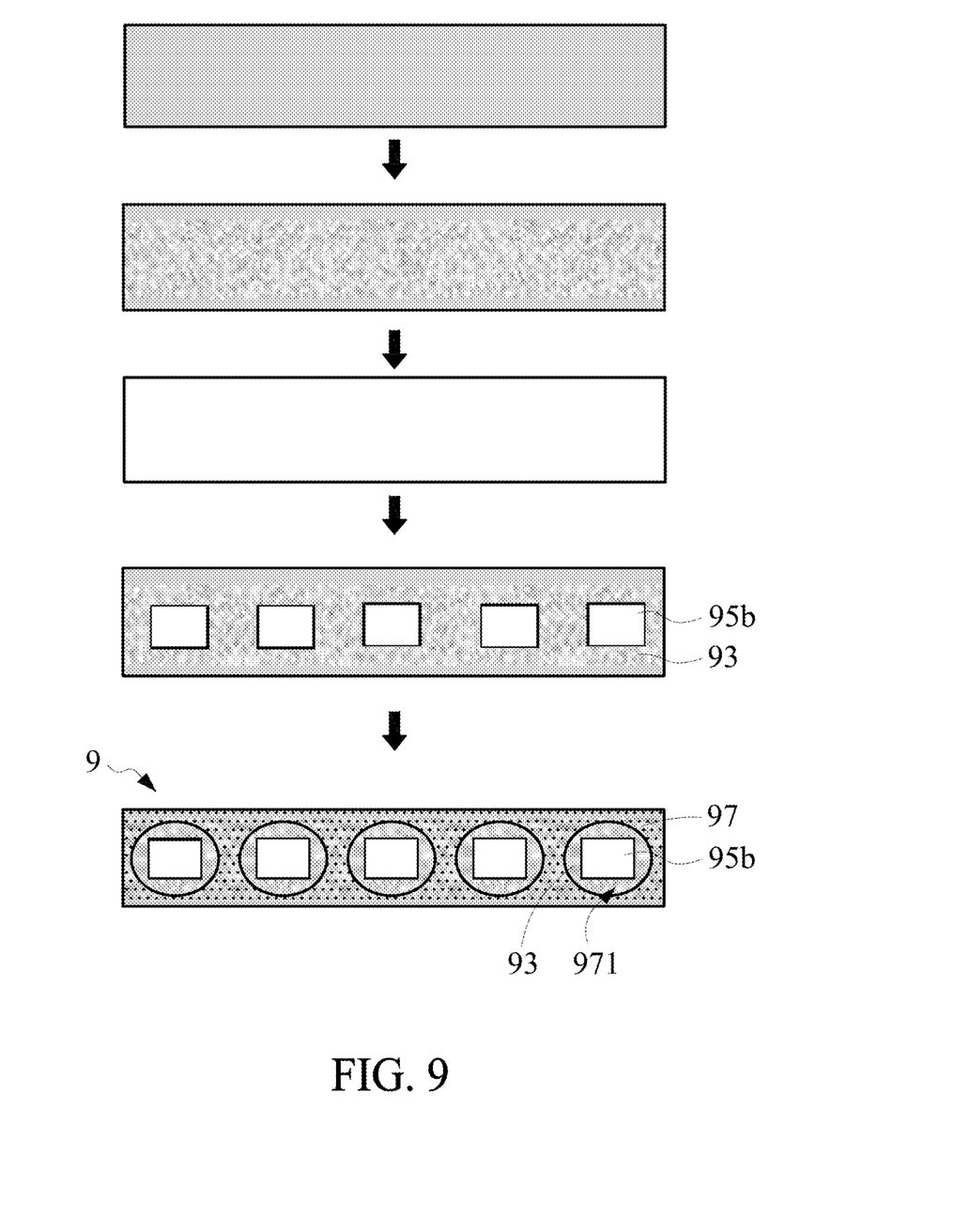
FIG. 9 is a top view of a process flow of manufacturing a label sticker according to the sixth embodiment of the present disclosure.
Figure 10:
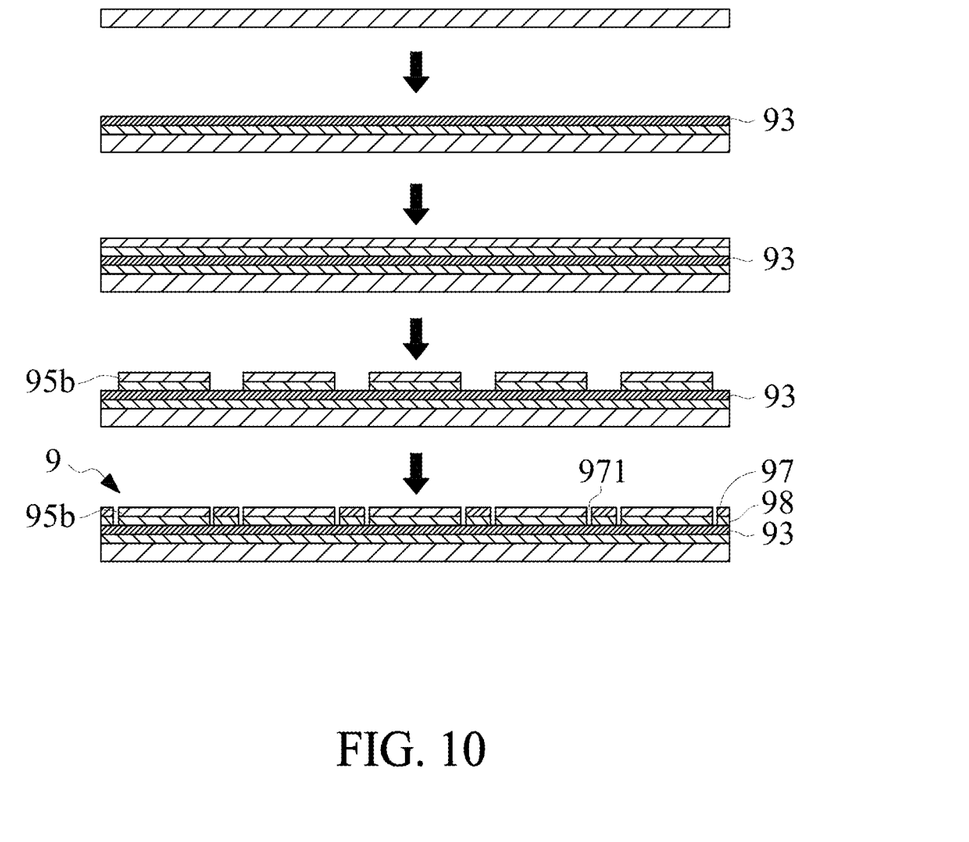
FIG. 10 is a cross-sectional view of a process flow of manufacturing the label sticker according to the sixth embodiment of the present disclosure.

The sixth embodiment of the present disclosure provides a label sticker 9. Referring to FIGS. 9 and 10, the label sticker 9 is substantially the same as the label sticker 2 of the second embodiment in structure and manufacturing process, except that the label sticker 9 further comprises a transit strip 97 (that is, requiring an additional process of covering the transit strip 97). The transit strip 97 is made of polyethylene terephthalate (PET). However, in a variant embodiment, the transit strip 97 is made of any conventional material of appropriate properties. The lower surface of the transit strip 97 is coated with a third glue layer 98. The transit strip 97 has a plurality of hollowed-out regions 971. The hollowed-out regions 971 correspond in number and position to the label pieces 95b. The area of each hollowed-out region 971 is greater than the area of a corresponding one of the label pieces 95b. The lower surface of the transit strip 97 is attached to the upper surface of the attachment layer strip 93 through the third glue layer 98. The label pieces 95b and a portion of the attachment layer strip 93 are exposed within the hollowed-out regions 971 of the transit strip 97. The attachment layer strip 93 exposed within the hollowed-out regions 971 of the transit strip 97 enhances air permeability. Referring to FIG. 10, the transit strip 97 not only prevents permeation of water from peripheral regions of the label pieces 95b but also reinforces the label sticker 9.

In the sixth embodiment, the transit strip 97 is separable from the attachment layer strip 93 and thus enhances air permeability. However, the sixth embodiment is not restrictive of the present disclosure.

Figure 11:
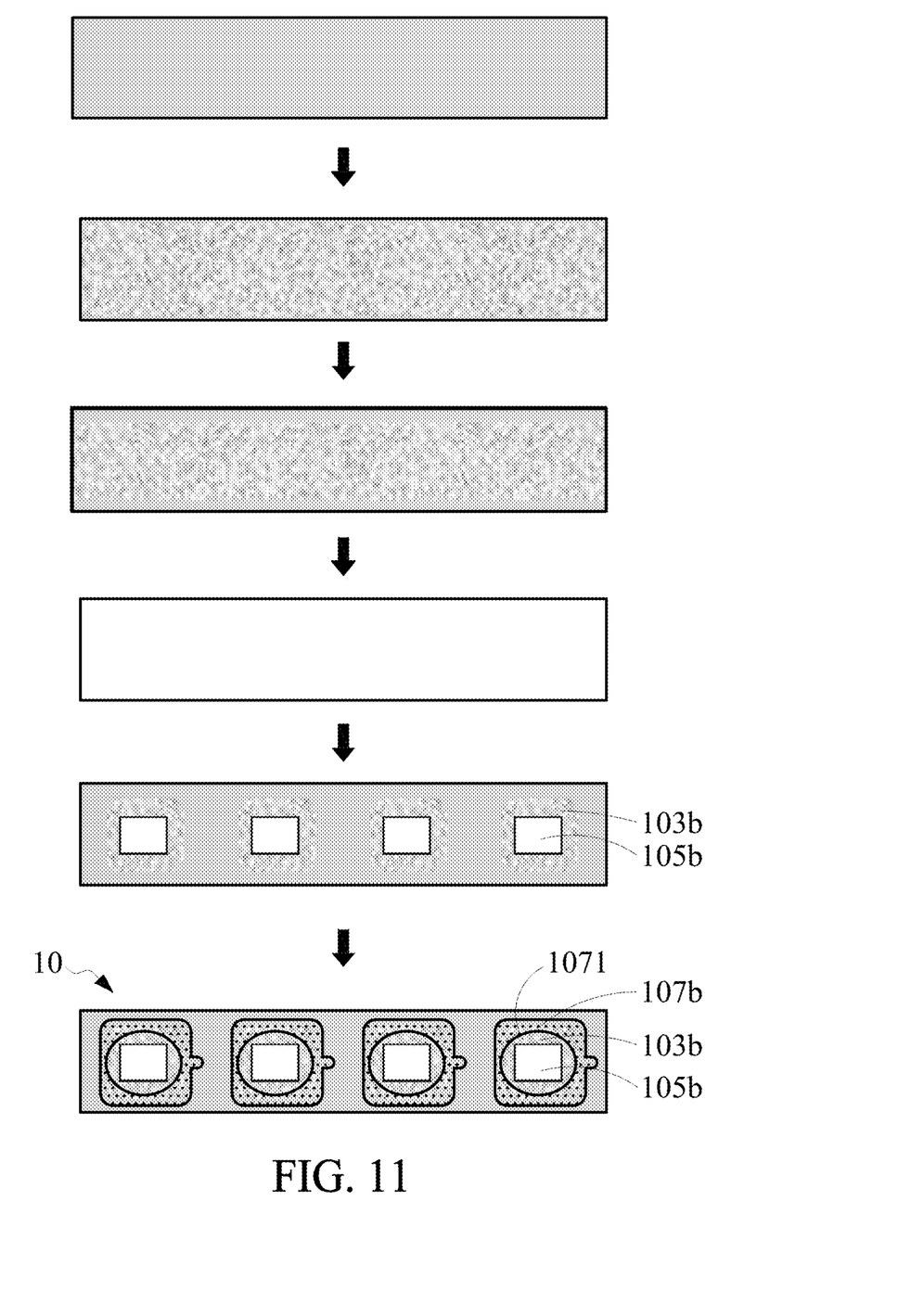
FIG. 11 is a top view of a process flow of manufacturing a label sticker according to the seventh embodiment of the present disclosure.
Figure 12:
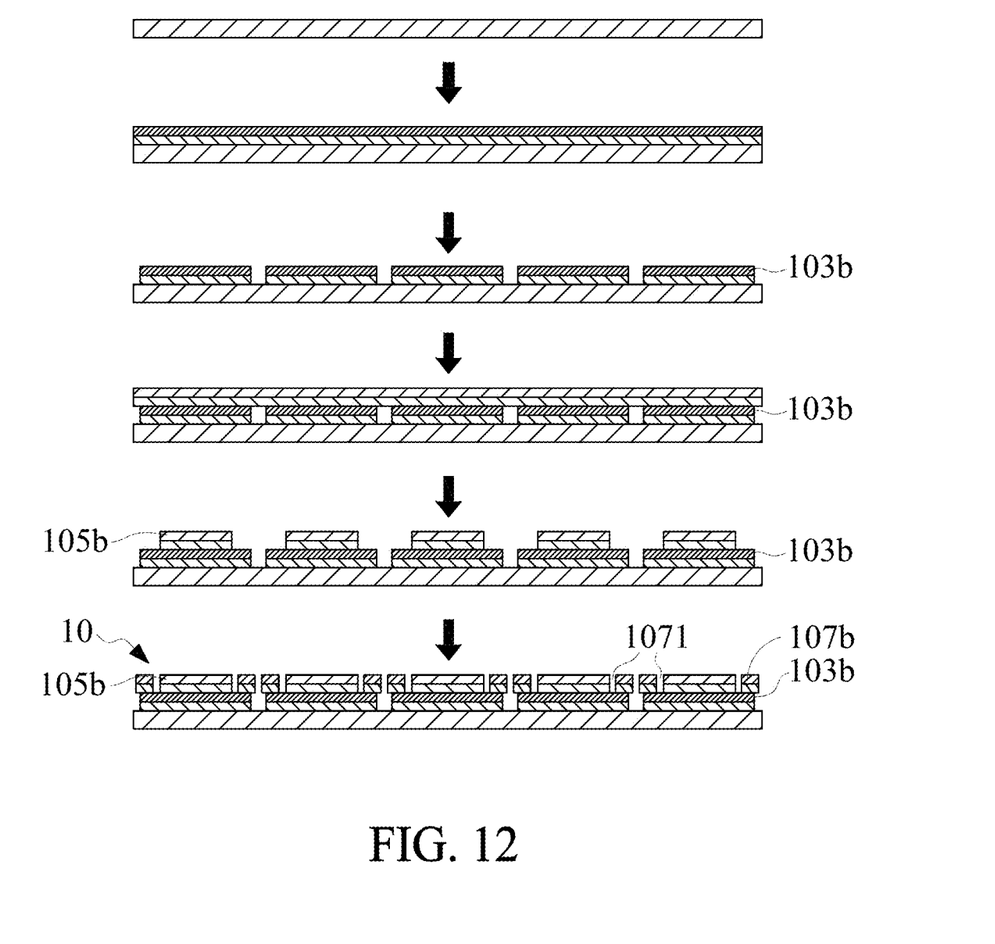
FIG. 12 is a cross-sectional view of a process flow of manufacturing the label sticker according to the seventh embodiment of the present disclosure.

The seventh embodiment of the present disclosure provides a label sticker 10. Referring to FIGS. 11 and 12, the label sticker 10 is substantially the same as the label sticker 3 of the third embodiment in structure and manufacturing process, except that the label sticker 10 further comprises a plurality of transit pieces 107b (that is, requiring an additional process of covering the transit pieces 107b). The transit pieces 107b are made of polyethylene terephthalate (PET). However, in a variant embodiment, the transit pieces 107b are made of any conventional material of appropriate properties. The lower surfaces of the transit pieces 107b are coated with a third glue layer 108. The transit pieces 107b each have a hollowed-out regions 1071. The areas of the hollowed-out regions 1071 are greater than the areas of the label pieces 105b, respectively. The lower surface of each transit piece 107b is attached to the upper surface of a corresponding one of the attachment pieces 103b through the third glue layer 108, such that corresponding ones of the label pieces 105b and corresponding ones of the attachment pieces 103b are exposed within hollowed-out regions 1071 of the transit pieces 107b. The attachment pieces 103b exposed within the hollowed-out regions 1071 of the transit pieces 107b enhances air permeability. Referring to FIG. 12, the transit pieces 107b not only prevents permeation of water from peripheral regions of the label pieces 105b but also reinforces the label sticker 10.

In the seventh embodiment, the transit pieces 107b are separable from the attachment pieces 103b and thus enhance air permeability, but the seventh embodiment is not restrictive of the present disclosure.

Figure 13:
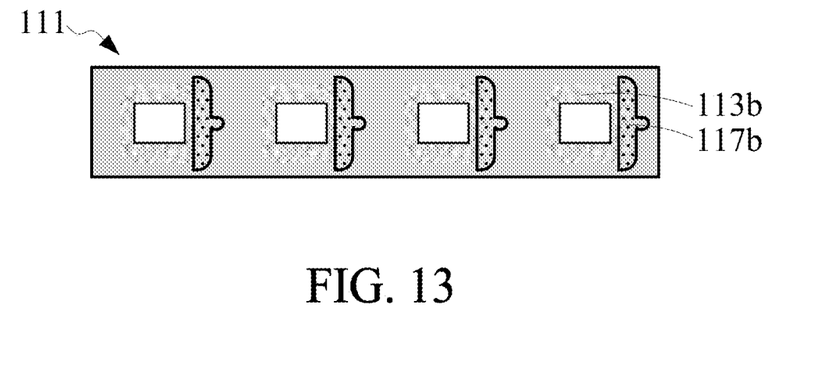
FIG. 13 is a top view of a label sticker according to the eighth embodiment of the present disclosure.

The eighth embodiment of the present disclosure provides a label sticker 111. Referring to FIG. 13, the label sticker 111 is substantially the same as the label sticker 10 of the seventh embodiment in structure and manufacturing process, except that the transit pieces 117b of the label sticker 111 cover only the peripheral regions of the attachment pieces 113b to further enhance air permeability. In the eighth embodiment, the transit pieces 117b are separable from the attachment pieces 113b and thus enhance air permeability, but the eighth embodiment is not restrictive of the present disclosure.

The label stickers enable the identification stickers, which are adhered to the human skin, can be manufactured by mass production. The label layer strip is made of a waterproof material, and thus the identification stickers are unlikely to be wetted and smeared. Manufacturing multiple identification stickers, by means of the label stickers, precludes a waste of material otherwise caused by a conventional identification sticker manufacturing process, thereby reducing manufacturing cost. The structure feature that the two ends of the label layer strip and the two ends of the attachment layer strip retract relative to the two ends of the release layer strip prevents the label layer strip and the attachment layer strip from being lifted from the point of attachment. In addition, users can obtain the identification stickers by tearing off the label stickers along the virtual cutter lines by hand instead of using a knife. The attachment pieces enable the users to obtain the identification stickers by means of the label stickers, further dispensing with the step of cutting or tearing the label sticker. The corners of the attachment pieces and the label pieces are conducive to reduction of stress concentration and thus lower the chance that the attachment pieces and the label pieces will be lifted off any external object which the corners of the attachment pieces and the label pieces have been in contact with or in friction with.

While the present disclosure has been described by means of specific embodiments, numerous modifications and variations could be made thereto by those skilled in the art without departing from the scope and spirit of the present disclosure set forth in the claims.

What is claimed is:

1. A label sticker, comprising:
   a release layer strip;
   an attachment layer strip made of an artificial dressing material, wherein a lower surface of the attachment layer strip is coated with or adhered to a first glue layer, and the lower surface of the attachment layer strip is attached to an upper surface of the release layer strip through the first glue layer; and
   a label layer strip made of a waterproof material, wherein a lower surface of the label layer strip is coated with or adhered to a second glue layer, and the lower surface of the label layer strip is attached to an upper surface of the attachment layer strip through the second glue layer, the second glue layer is directly attached to the upper surface of the attachment layer strip;
   wherein two ends of the attachment layer strip retract relative to two ends of the release layer strip.

2. The label sticker of claim 1, wherein two ends of the label layer strip retract relative to two ends of the release layer strip.

3. A label sticker, comprising:
   a release layer strip;
   an attachment layer strip made of an artificial dressing material, wherein a lower surface of the attachment layer strip is coated with or adhered to a first glue layer, and the lower surface of the attachment layer strip is attached to an upper surface of the release layer strip through the first glue layer; and
   a plurality of label pieces made of a waterproof material, wherein a lower surface of each said label piece is coated with or adhered to a second glue layer, and the lower surface of each said label piece is attached to an upper surface of the attachment layer strip through the second glue layer, the label pieces being spaced apart, the second glue layer is directly attached to the upper surface of the attachment layer strip;
   wherein two ends of the attachment layer strip retract relative to two ends of the release layer strip.

4. The label sticker of claim 3, wherein a corner of each said label piece is a rounded angle, bevel angle or obtuse angle.

5. The label sticker of claim 3, further comprising a transit strip, the transit strip having a lower surface coated with or adhered to a third glue layer, the transit strip having a plurality of hollowed-out regions corresponding in number and position to the label pieces, each said hollowed-out region being of an area greater than a corresponding one of the label pieces, wherein the lower surface of the transit strip is attached to the upper surface of the attachment layer strip through the third glue layer, such that the label pieces and a portion of the attachment layer strip are exposed within the hollowed-out regions of the transit strip.

6. A label sticker, comprising:
   a release layer strip;
   a plurality of attachment pieces made of an artificial dressing material, wherein a lower surface of each said attachment piece is coated with or adhered to a first glue layer, and the lower surface of each said attachment piece is attached to an upper surface of the release layer strip through the first glue layer, the attachment pieces being spaced apart; and
   a plurality of label pieces made of a waterproof material and corresponding in number to the attachment pieces, wherein a lower surface of each said label piece is coated with or adhered to a second glue layer, and the lower surface of each said label piece is attached to an upper surface of the corresponding attachment piece through the second glue layer, the second glue layer of each said label piece is directly attached to the upper surface of the corresponding attachment piece;
   wherein two ends of each said attachment piece retract relative to two ends of the release layer strip.

7. The label sticker of claim 6, wherein corners of the attachment pieces and the label pieces are rounded angles, bevel angles or obtuse angles.

8. The label sticker of claim 6, further comprising a plurality of transit pieces corresponding in number to the label pieces, wherein each said transit piece has a lower surface coated with or adhered to a third glue layer and has a hollowed-out region of an area greater than a corresponding one of the label pieces, wherein the lower surfaces of the transit pieces are attached to the upper surfaces of the attachment pieces, respectively, through the third glue layer, such that corresponding ones of the label pieces and corresponding ones of the attachment pieces are exposed within the hollowed-out regions of the transit pieces, respectively.

* * * * *